United States Patent Office 3,144,470
Patented Aug. 11, 1964

3,144,470
PROCESS OF PREPARING 4-HYDROXY-3-KETO-$\Delta^4$-STEROIDS
Luciano Caglioti and Gianfranco Cainelli, Milan, Italy, assignors to Società Farmaceutici Italia, Milan, Italy, a corporation of Italy
No Drawing. Filed July 15, 1963, Ser. No. 295,208
Claims priority, application Italy July 19, 1962
3 Claims. (Cl. 260—397.4)

Our invention relates to a process of preparing 4-hydroxy-3-keto-$\Delta^4$-steroids of the androstane and 19-norandrostane series.

An object of our invention is the preparation of compounds having the formula:

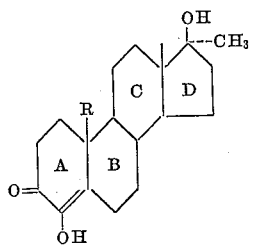

wherein R is selected from the group consisting of hydrogen and a methyl group, which compounds are known as anabolic substances from U.S. Patent 3,068,247, for example.

The process of our invention which may be illustrated by the following scheme:

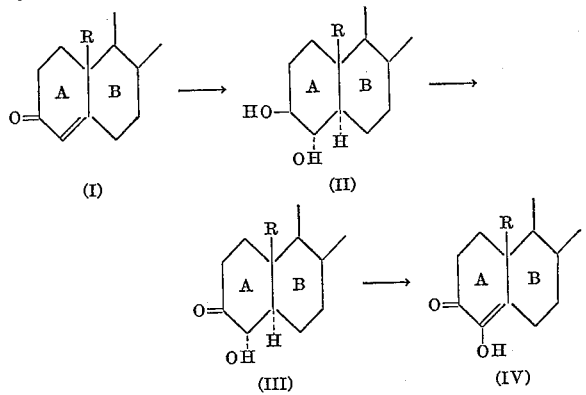

in which R has the significance mentioned above, comprises the hydroboration of a 3-keto-$\Delta^4$-steroid I to the corresponding 3β,4α-dihydroxy-5α-steroid II, its oxidation with N-bromoacetamide in an inert solvent to the corresponding 3-keto-4α-hydroxy-5α-steroid III, and further oxidation with oxygen or air in an alkali metal hydroxide in alcoholic solution to yield the corresponding 4-hydroxy-3-keto-$\Delta^4$-steroid IV.

In greater detail the process of the invention may be carried out as follows: The starting 3-keto-$\Delta^4$-steroid I, such as 17α-methyl-testosterone or 17α-methyl-19-nor-testosterone, is treated with diborane under nitrogen, at atmospheric pressure and at a temperature of from 0° C. to 50° C. The reaction mixture is further treated with alkaline hydrogen peroxide, preferably at room temperature, to isolate the product II: 17α-methyl-5α-androstane-3β,4α,17β-triol or 17α-methyl-19-nor-5α-androstane-3β,4α,17β-triol. The hydroboration reaction may for example be carried out either by bubbling gaseous diborane into the solution containing the steroid or by adding a diborane solution in an organic solvent, or diborane in the form of a complex, or by forming it "in situ," for example by adding lithium aluminum hydride and boron trifluoride. An ether, for example ethyl ether, propyl ether, tetrahydrofuran, diethyleneglycol dimethylether and their analogues may be employed as a solvent for the above hydroboration.

The compound II is then oxidized with N-bromoacetamide in an inert solvent, such as dimethylformamide, preferably at room temperature to yield product III, which may be isolated and purified.

The compound III, 17α-methyl-5α-androstane-4α,17β-diol-3-one or 17α-methyl-19-nor-5α-androstane-4α,17β-diol-3-one, is further oxidized with oxygen or air in the presence of an alkali metal hydroxide in alcoholic solution, preferably at room temperature. The oxidation may be carried out either with atmospheric oxygen or with pure oxygen: air or pure oxygen being passed into the solution, or the solution containing the steroid being treated at the surface by stirring. Sodium or potassium hydroxide for example may be employed as the alkali metal hydroxide and methyl or ethyl alcohol as the alcohol.

The final product IV, thus obtained: 4-hydroxy-17α-methyl-testosterone or 4-hydroxy - 17α - methyl-19-nor-testosterone may be isolated and purified.

The following examples are for the purpose of illustrating, but not limiting, the invention.

EXAMPLE 1

*17α-Methyl-5α-Androstane-3β,4α,17β-Triol*

5 g. of 17α-methyl-testosterone, dissolved in 100 cc. of tetrahydrofuran, are treated for 4 hours at room temperature with a large excess of diborane under an atmosphere of anhydrous nitrogen. After 4 hours, 50 cc. of 5% methanol sodium hydroxide and then 15 cc. of 30% hydrogen peroxide are added to the reaction mixture. After stirring for 20 minutes, 300 cc. of water are added to the mixture, which is allowed to stand for 12 hours. The mixture is next filtered through a sintered glass filter, abundantly washed with water, and the precipitate is recrystallized from methanol-water. Melting point: 258–260° C.: $[\alpha]_D^{20}=-6°$ (c.=1 in dimethylformamide).

EXAMPLE 2

*17α-Methyl-5α-Androstane-4α,17β-Diol-3-One*

1 g. of 17α-methyl-5α-androstane-3β,4α,17β-triol, dissolved in 50 cc. of dimethylformamide, is treated with 2 g. of N-bromoacetamide at room temperature. After standing overnight, the reaction mixture is poured into water and extracted with diethyl ether. The ether extracts are washed with 5% of aqueous caustic soda, and then with water several times to neutrality, and dried over sodium sulfate. By evaporating off the ether, a crystalline product is obtained, which is then recrystallized from methanol-water. Melting point: 193° C.: $[\alpha]_D^{20}=-19°$ (c.=1 in chloroform).

EXAMPLE 3

*4-Hydroxy-17α-Methyl-Testosterone*

50 mg. of the ketol of Example 2 are dissolved in 20 cc. of 10% methanol potassium hydroxide and vigorously stirred overnight. The solution is diluted with water and extracted with diethyl ether. The ether extracts are washed to neutrality with water, dried over sodium sulfate and the solvent is distilled off. The crystalline residue is purified by recrystallization from acetone-n-heptane. Melting point: 173–175° C.; $\lambda_{max}$ at 278 mμ, $\epsilon=12,500$.

EXAMPLE 4

*17α-Methyl-19-Nor-5α-Androstane-3β,4α,17β-Triol*

1 g. of 17α-methyl-19-nor-testosterone, dissolved in 20 cc. of tetrahydrofuran, is treated for 2 hours at 0° C.

with a large excess of diborane under an atmosphere of anhydrous nitrogen. The reaction mixture is kept at room temperature for 1 hour, 50 cc. of 50% methanol sodium hydroxide and then 15 cc. of 30% hydrogen peroxide are added. The mixture is stirred for 20 minutes, thereafter 500 c. of water are added and the whole is allowed to stand for 12 hours and filtered through a sintered glass filter, washed with abundant water, and the precipitate is recrystallized from metahnol-water. Melting point: 211–213° C.; $[\alpha]_D^{20} = -7°$ (c.=1 in methanol).

EXAMPLE 5

17α-Methyl-19-Nor-5α-Androstane-4α,17β-Diol-3-One 300 mg. of 17α-methyl-19-nor-5α-androstane-3β,4α,17β-triol, dissolved in 20 cc. of dimethylformamide, are treated with 1 g. of N-bromoacetamide at room temperature. After standing overnight, the reaction mixture is poured into water and extracted with diethyl ether. The ether extracts are washed with 5% aqueous caustic soda and several times with water to neutrality. By evaporating off the ethereal solution, previously dried over sodium sulfate, a crystalline product is obtained, which is recrystallized from ether-petroleum ether several times. Melting point: 146° C.; $[\alpha]_D^{20} = 0°$ (c.=1 in chloroform).

EXAMPLE 6

4-Hydroxy-17α-Methyl-19-Nor-Testosterone 100 mg. of the ketol III of Example 5 are dissolved in 80 cc. of 10% methanol potassium hydroxide and vigorously stirred overnight. Then 320 cc. of water and diethyl ether are added and the whole is shaken vigorously. The ethereal layer which separates is washed with water to neutrality, dried over sodium sulfate and evaporated in vacuo. The crystalline residue is purified by recrystallization from acetone-petroleum ether. Melting point: 168–170° C.; $\lambda_{max}$ at 277 m$\mu$, $\epsilon = 12,800$.

We claim:
1. A process for preparing 4-hydroxy-3-keto-$\Delta^4$-steroids of the formula:

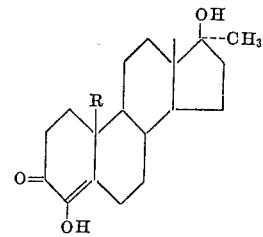

wherein R is selected from the group consisting of H and CH$_3$, which comprises reacting a compound selected from the group consisting of 17α-methyl-testosterone and 17α-methyl-19-nor-testosterone with diborane, under nitrogen, in an inert solvent and at a temperature of from 0° to 50° C., oxidizing the resulting 3β,4α-dihydroxy-5α-steroid with N-bromoacetamide in an inert solvent, further oxidizing the resulting 3-keto-4α-hydroxy-5α-steroid with a gas selected from the group consisting of oxygen and air in the presence of an alkali hydroxide in alcohol solution, and isolating the resulting 4-hydroxy-3-keto-$\Delta^4$-steroid.

2. A process according to claim 1, wherein 17α-methyl-testosterone is treated so as to yield 4-hydroxy-17α-methyl-testosterone.

3. A process according to claim 1, wherein 17α-methyl-19-nor-testosterone is treated so as to yield 4-hydroxy-17α-methyl-19-nor-testosterone.

References Cited in the file of this patent

UNITED STATES PATENTS

| | | |
|---|---|---|
| 3,060,201 | Camerino et al. | Oct. 23, 1962 |
| 3,068,225 | Camerino et al. | Dec. 11, 1962 |